(12) United States Patent
Zemany et al.

(10) Patent No.: US 11,808,868 B2
(45) Date of Patent: Nov. 7, 2023

(54) EARLY VELOCITY MEASUREMENT FOR PROJECTILES BY DETECTING SPIN

(71) Applicant: BAE Systems Information and Electronic Systems Integration Inc., Nashua, NH (US)

(72) Inventors: Paul D. Zemany, Amherst, NH (US); Matthew F. Chrobak, Groton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 600 days.

(21) Appl. No.: 16/972,251

(22) PCT Filed: Aug. 30, 2019

(86) PCT No.: PCT/US2019/049010
§ 371 (c)(1),
(2) Date: Dec. 4, 2020

(87) PCT Pub. No.: WO2020/072153
PCT Pub. Date: Apr. 9, 2020

(65) Prior Publication Data
US 2021/0239430 A1 Aug. 5, 2021

Related U.S. Application Data

(60) Provisional application No. 62/725,466, filed on Aug. 31, 2018.

(51) Int. Cl.
*G01S 19/50* (2010.01)
*G01S 19/52* (2010.01)
(Continued)

(52) U.S. Cl.
CPC .............. *G01S 19/52* (2013.01); *F42B 10/26* (2013.01); *F42B 10/62* (2013.01); *F42B 10/64* (2013.01); *G01S 19/18* (2013.01)

(58) Field of Classification Search
CPC .......... G01S 19/52; G01S 19/18; F42B 10/26; F42B 10/46
See application file for complete search history.

(56) References Cited

U.S. PATENT DOCUMENTS 6,135,387 A 10/2000 Seidel et al.
7,163,176 B1 * 1/2007 Geswender ............. F42B 10/64
102/490

(Continued)

FOREIGN PATENT DOCUMENTS

DE 10 2015 009980 A1 2/2017
EP 1 929 236 A2 6/2008

(Continued)

OTHER PUBLICATIONS

Estimation of the velocity of a projectile using radial accelerometers Jan. 2023.*

(Continued)

*Primary Examiner* — Richard G Davis
(74) *Attorney, Agent, or Firm* — Scott J. Asmus; Sand, Sebolt & Wernow LPA (57) ABSTRACT

A sensor determines the spin rate or rotation frequency of a munition body of a guided projectile relative to precision guidance munition assembly. The spin rate is used to determine launch velocity of the guided projectile early in flight before GPS is operationally active. The launch velocity is used to determine whether a corrective maneuver is needed to change the range of the guided projectile. Logic can control the canards on the canard assembly in response to the determination that a corrective maneuver is needed.

20 Claims, 5 Drawing Sheets

(51) Int. Cl.
*F42B 10/26* (2006.01)
*F42B 10/64* (2006.01)
*G01S 19/18* (2010.01)
*F42B 10/62* (2006.01)

(56) References Cited

U.S. PATENT DOCUMENTS

| | | | |
|---|---|---|---|
| 2004/0188561 A1* | 9/2004 | Ratkovic | G01C 21/165 |
| | | | 244/3.1 |
| 2006/0065775 A1 | 3/2006 | Smith et al. | |
| 2007/0243504 A1 | 10/2007 | Bjorkman et al. | |
| 2012/0175459 A1 | 7/2012 | Geswender et al. | |
| 2012/0217338 A1 | 8/2012 | Flood et al. | |
| 2012/0248239 A1* | 10/2012 | Geswender | F42B 10/64 |
| | | | 244/3.23 |
| 2015/0247715 A1 | 9/2015 | Wurzel et al. | |
| 2016/0018202 A1 | 1/2016 | Nash et al. | |
| 2016/0349026 A1* | 12/2016 | Fairfax | F42B 10/26 |
| 2017/0363428 A1* | 12/2017 | Faulkner | G01C 21/165 |

FOREIGN PATENT DOCUMENTS

| | | | |
|---|---|---|---|
| EP | 3 260 815 A1 | 12/2017 | |
| WO | 2007030687 A2 | 3/2007 | |
| WO | 2007030687 A3 | 3/2007 | |

OTHER PUBLICATIONS

EP Search Report, EP 19869623.9, dated May 2, 2022, 7 pages.
International Search Report, PCT/19/49010, dated Mar. 2, 2020, 11 pages.

* cited by examiner

EARLY VELOCITY MEASUREMENT FOR PROJECTILES BY DETECTING SPIN

CROSS REFERENCE TO RELATED APPLICATIONS

This application claims the benefit of U.S. Provisional patent Application No. 62/725,466, filed Aug. 31, 2018, the content of which is incorporated by reference herein its entirety.

TECHNICAL FIELD

The present disclosure relates generally to guiding projectiles. More particularly, the present disclosure relates to an early velocity measurement system that detects velocity of the guided projectile based on a spin rate or rotation frequency of the guided projectile.

BACKGROUND

Guided projectiles are typically limited in how much they can maneuver. Thus, increasing the maneuver authority of a guided projectile is an important component in designing a guided projectile. The launch velocity determines the projectile range and thus it is important to account for variations in launch velocity. The launch velocity depends on the gun powder and explosive force used to discharge the guided projectile which can vary due to many factors. When the guided projectile is launched from a launch assembly, such as a barrel or gun tube, the rate at which the guided projectile spins is directly related to its launch speed or launch velocity. The velocity of the projectile is a function of the spin rate times a constant. The constant relating spin rate and launch velocity depends on the gun barrel rifling.

SUMMARY

Issues continue to exist with launching guided projectiles inasmuch as when they are launched from the launch assembly, such as a gun barrel, the velocity can vary based on the explosive charge, temperature, wind, and other external conditions. The variable velocity introduces an error, which results in a change in the range from the intended target. The present disclosure addresses these issues by measuring the spin rate shortly after being launched from the launch assembly and using the result to correct the guided projectile trajectory to reduce the range error. This early spin measurement allows more range control authority as compared to other sensors that require a longer time to estimate range error.

In one aspect, an embodiment of the present disclosure provides a sensor that is utilized to determine the spin rate or rotation frequency of the munition body of the guided projectile relative to a precision guidance munition assembly. The precision guidance munition assembly is "despun." The term "despun" refers to the fact that the precision guidance munition assembly stays relatively stationary or is slowly spinning as the body of the guided projectile is rotating about a longitudinal axis of the guided projectile. Alternatively, the precision guidance munition assembly is spinning at a different but known rate as measured by a sensor mounted on or in the precision guidance munition assembly. In one particular embodiment, the sensor is a hall effect sensor that is carried by the precision guidance munition assembly that cooperates with a small magnet carried by the body. Thus, when the body rotates, it effectuates rotation of the magnet. As the magnet passes the hall effect sensor, the magnet generates a small pulse that is observed or detected by the hall effect sensor. The hall effect sensor measures the pluses, over a period of time, to determine the frequency at which the body is spinning or rotating about the longitudinal axis.

In another aspect, an embodiment of the present disclosure provides a precision guidance munition assembly for a guided projectile, comprising: a canard assembly including at least one canard that is moveable; a munition body positioned rearward from the canard assembly and extending along a longitudinal axis, wherein the munition body rotates about the longitudinal axis; and a rotation sensor carried by the precision guidance munition assembly to sense a rotation frequency of the munition body after the guided projectile is fired from a launch assembly and before another sensing device detects a velocity of the guided projectile. This embodiment may further provide wherein the rotation sensor is carried by the precision guidance munition assembly.

The present embodiment further provides wherein the rotation sensor is a hall effect sensor, and further comprising: a magnet carried by the munition body positioned to move past the hall effect sensor when the munition body rotates about the longitudinal axis. The embodiment further provides at least one non-transitory computer-readable storage medium carried by the precision guidance munition assembly having instructions encoded thereon that, when executed by at least one processor operates to aid in guidance, navigation and control of the guided projectile. The instructions include: determine the rotation frequency of the munition body with the rotation sensor; determine a velocity of the guided projectile based, at least in part, on the rotation frequency; determine a range of the guided projectile based, at least in part, on the velocity; determine whether the expected range is sufficient for the guided projectile to impact a target. The instructions further include the range is determined based on the target location and the expected impact point as determined in part by the velocity estimate based on a known distance between the target and the launch assembly. Further, if the range is insufficient, then adjust one of the at least one canards on the canard assembly to maneuver the guided projectile towards the target and reduce range error.

The present embodiment includes further instructions comprising initiating a global positioning system (GPS) carried by the precision guidance munition assembly after the guided projectile is fired from the launch assembly, wherein the GPS is another sensing device. The GPS is activated after a first period of time, wherein the first period of time is measured from when the guided projectile exits the gun launch assembly to when the GPS is actively operational. The instructions further include: determine the rotation frequency of the guided projectile during the first period of time, before the GPS is activated; cease sensing the rotation frequency of the munition body with the rotation sensor once the GPS is activated; and guide the guided projectile based on the GPS after the first period of time.

The present embodiment further provides a rearward edge on precision guidance munition assembly; a forward edge on the munition body; a gap defined between the rearward edge and the forward edge; and wherein the rotation sensor is adjacent one of the rearward edge and the forward edge. The embodiment may further provide a rearward operational orientation of the rotation sensor. In one example there is at least one rotation signal generator carried by and positioned adjacent the forward edge of the munition body. The least one rotation signal generator can be a magnet that generates a signal in the rotation sensor positioned adjacent the rearward edge of the precision guidance munition assembly.

Another embodiment may provide a microprocessor in the precision guidance munition assembly to move two diametrically opposite lift canards in response to the launch and the velocity of the guided projectile. An embodiment further provides at least one lift canard on the canard assembly; and at least one roll canard on the canard assembly. The embodiment provides the precision guidance munition assembly being despun relative to the munition body, and may further provide wherein the rotation frequency is in a range from about 100 hertz (Hz) to about 300 Hz.

One embodiment further provides estimation logic to determine whether a range error of the guided projectile will cause the guided projectile to miss an intended target. The estimation logic uses a nominal launch velocity of the guided projectile based, at least in part, on an explosive charge used to fire the guided projectile from the launch assembly. Some embodiments may further provide a lift canard on the canard assembly that is maneuvered to orient the lift canard at an approximate horizontal orientation; and estimation logic to compare launch velocity of the guided projectile, based on the rotation frequency, with a predicted launch velocity based on rifling of the launch assembly and a known explosive charge in the launch assembly; and a first position of the lift canard to maneuver the guided projectile if the estimation logic determines the guided projectile will overshoot the intended target, and a second position of the lift canard to maneuver the guided projectile if the estimation logic determines the guided projectile will undershoot the intended target.

In yet another aspect, an embodiment of the present disclosure provides a method comprising: firing a guided projectile including a precision guidance munition assembly from a launch assembly towards a target; determining a rotation frequency of a munition body of the guided projectile with a rotation sensor; determining a velocity of the guided projectile based, at least in part, on the rotation frequency; determining a range of the guided projectile based, at least in part, on the velocity; determining whether the range is sufficient for the guided projectile to impact the target based on a known distance between the target and the launch assembly from which the guided projectile was fired; and if the range is insufficient, then adjust at least one canard on a canard assembly to maneuver the guided projectile towards the target and reduce range error.

This method may further provide de-spinning the precision guidance munition assembly relative to the munition body. This method further provides initiating a global positioning system (GPS) carried by the precision guidance munition assembly after the guided projectile is fired from the launch assembly, wherein the GPS is different from the rotation sensor, and the GPS is activated after a first period of time, wherein the first period of time is measured from when the guided projectile exits the launch assembly to when the GPS is actively operational. This method may further provide determining the rotation frequency of the munition body during the first period of time before the GPS is activated. This method may further provide ceasing the sensing of the rotation frequency of the munition body with the rotation sensor once the GPS is activated. This method may further provide maneuvering the guided projectile based on the GPS after the first period of time.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
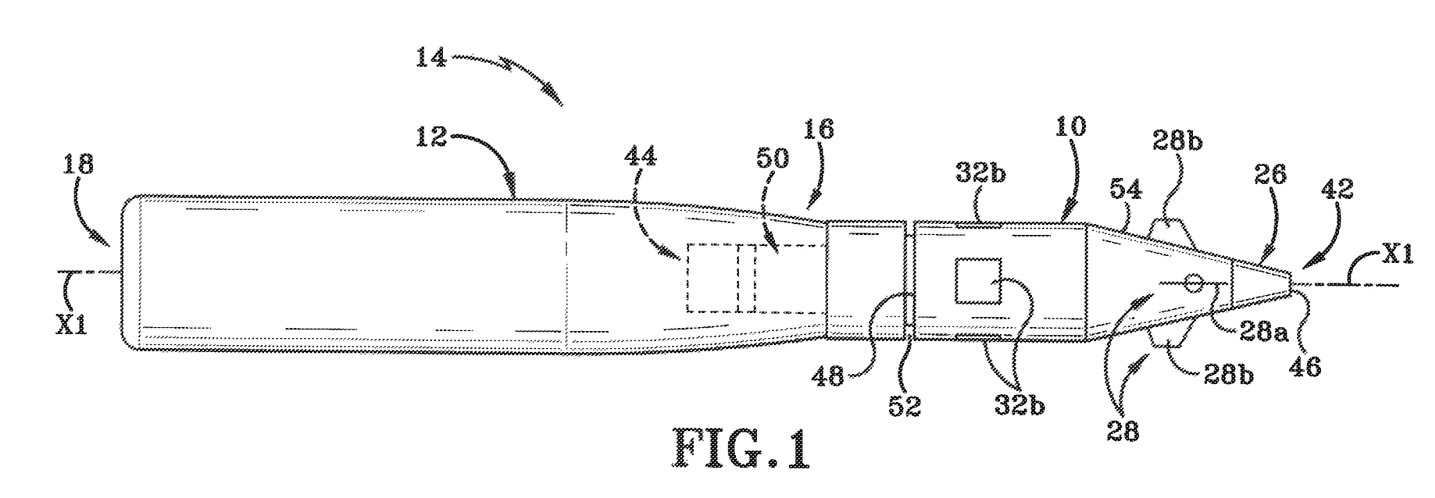
FIG. 1 is a schematic view of a guided projectile including a munition body and a precision guidance munition assembly in accordance with one aspect of the present disclosure.

A precision guidance munition assembly (PGMA) in accordance with the present disclosure is shown generally at 10. As shown in FIG. 1, the PGMA 10 may be operatively coupled with a munition body 12, which may also be referred to as a projectile, to create a guided projectile 14. In one example, the PGMA 10 is connected to the munition body 12 via a threaded connection; however, the PGMA 10 may be connected to the munition body 12 in any suitable manner. The PGMA 10 can be fastened to the munition body as part of the manufacturing process or afterwards. In one example, such as the APWKS precision guided kit, the PGMA is coupled between the munition body and front end assembly thereby turning a projectile into a precision guided projectile.

Figure 3:
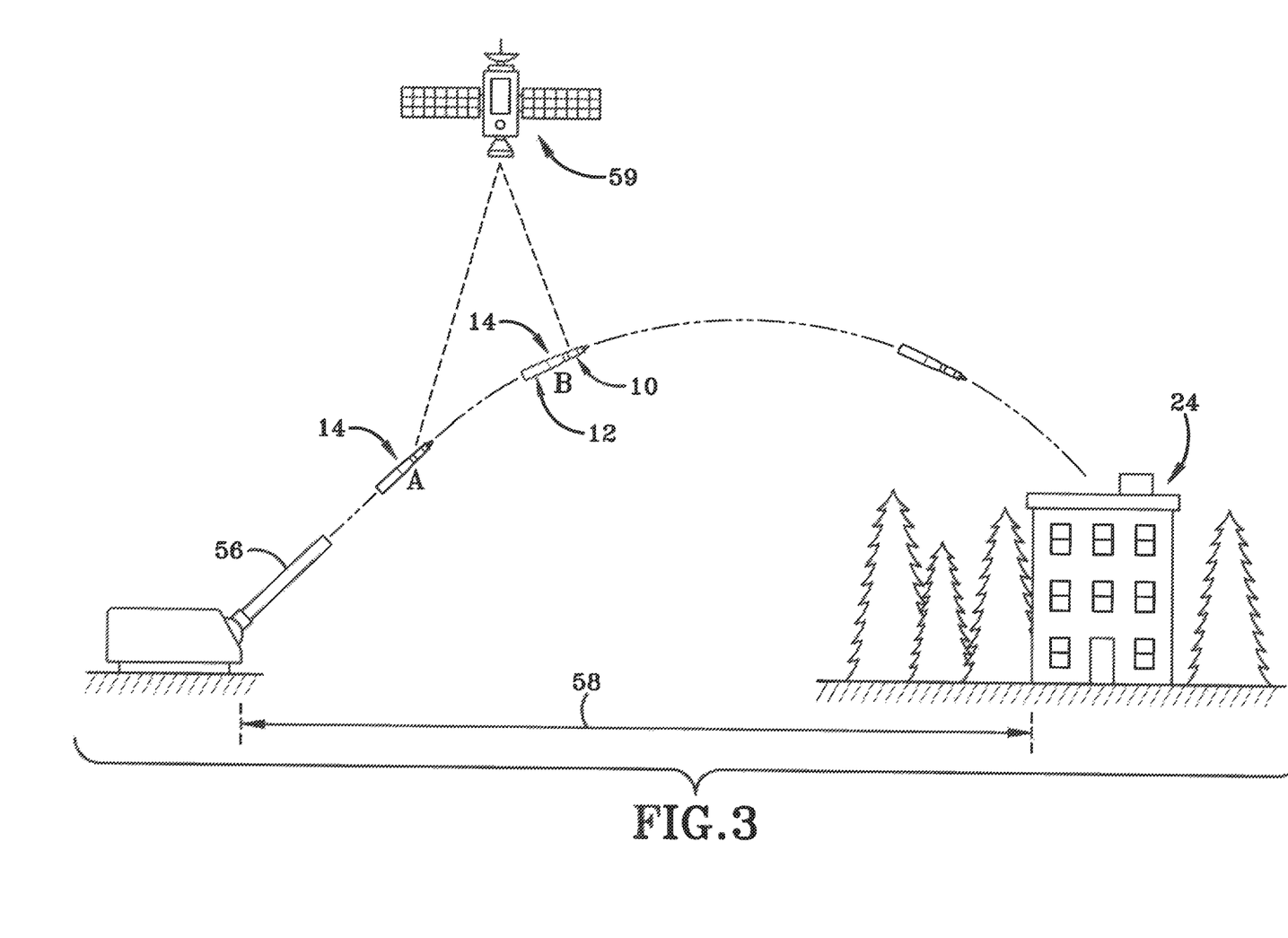
FIG. 3 is an operational schematic view of the guided projectile including the munition body and the precision guidance munition assembly fired from a launch assembly according to one embodiment.

FIG. 1 depicts that the munition body 12 includes a front end 16 and an opposite tail or rear end 18 defining a longitudinal direction therebetween. The munition body 12 includes a first annular edge 20 (FIG. 1A), which, in one particular embodiment, is a leading edge on the munition body 12 such that the first annular edge 20 is a leading annular edge that is positioned at the front end 16 of the munition body 12. The munition body 12 defines a cylindrical cavity 22 (FIG. 1A) extending rearward from the first annular edge 20 longitudinally centrally along a center of the munition body 12. The munition body 12 is formed from material, such as metal, that is structurally sufficient to carry an explosive charge configured to detonate or explode at, or near, a target 24 (FIG. 3). The munition body 12 may include tail flights (not shown) which help stabilize the munition body 12 during flight.

Figure 1A:
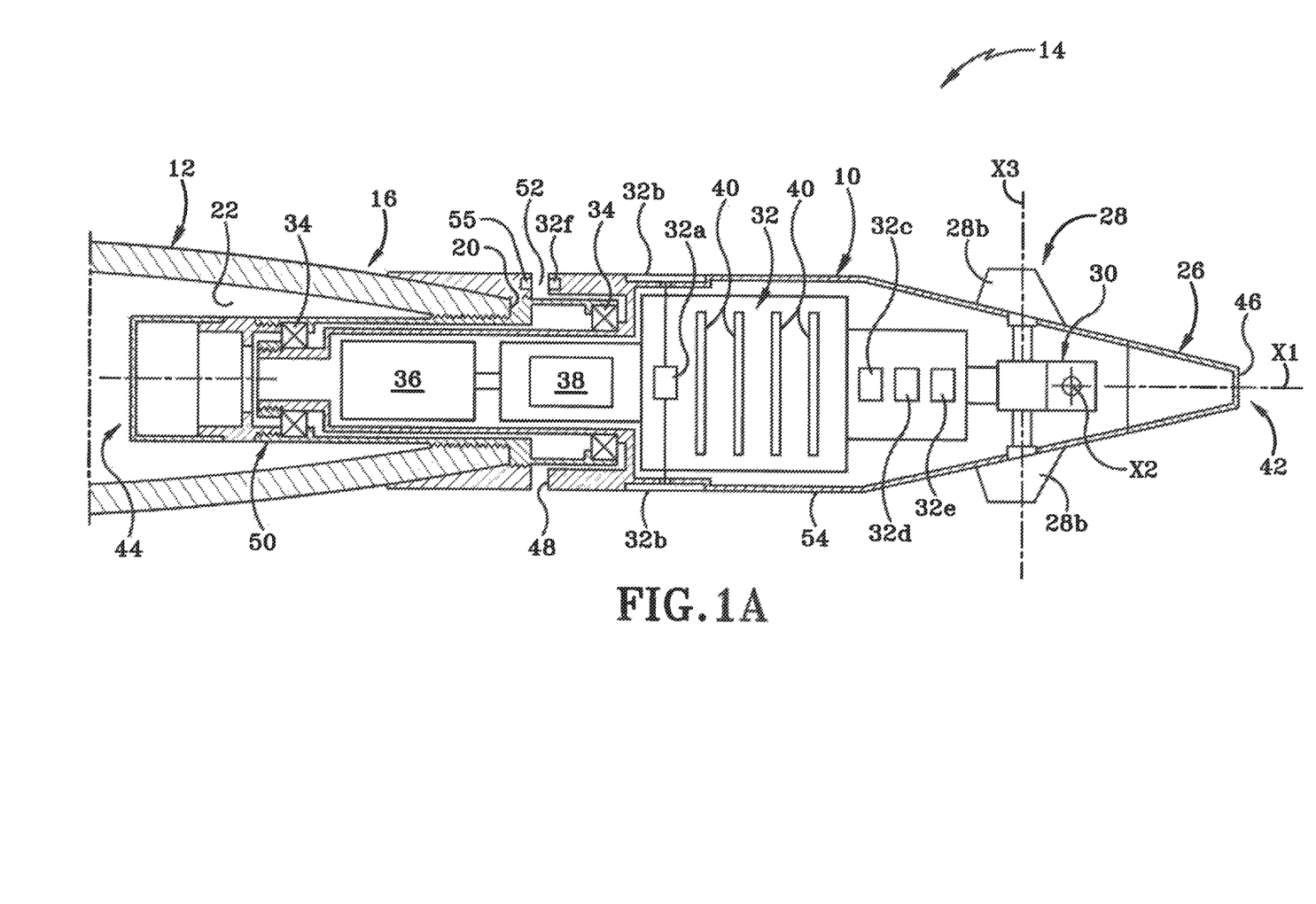
FIG. 1A is an enlarged fragmentary cross-section view of the guided projectile including the munition body and the precision guidance munition assembly in accordance with one aspect of the present disclosure.

FIG. 1A depicts that the PGMA 10, which may also be referred to as a despun assembly, includes, in one example, a fuze setter 26, a canard assembly 28 having one or more canards 28a, 28b, a control actuation system (CAS) 30, a guidance, navigation and control (GNC) section 32 having a guiding sensor 32a, such as a global positioning system (GPS), at least one GPS antenna 32b, a magnetometer 32c, a microelectromechanical systems (MEMS) gyroscope 32d, an MEMS accelerometer 32e, and a rotation sensor 32f, at least one bearing 34, a battery 36, at least one non-transitory computer-readable storage medium 38, and at least one processor or microprocessor 40.

Although the GNC section 32 has been described in FIG. 1A as having particular sensors, it should be noted that in other examples the GNC section 32 may include other sensors, including, but not limited to, laser guided sensors, electro-optical sensors, imaging sensors, inertial navigation systems (INSs), inertial measurement units (IMUs), or any other suitable sensors. In one example, the GNC section 32 may include an electro-optical and/or imaging sensor positioned on a forward portion of the PGMA 10. In another example, there may be multiple sensors employed such that the guided projectile 14 can operate in a GPS-denied environment and for highly accurate targeting. The projectile in one example has multiple sensors and switches from one sensor to another during flight. For example, the projectile can employ GPS while it is available but then switch to another sensor for greater accuracy or if the GPS signal is unreliable or no longer available. For example, it may switch to an imaging sensor to hone in to a precise target.

The at least one computer-readable storage medium 38 includes instructions encoded thereon that when executed by the at least one processor 40 carried by the PGMA 10 implements operations to aid in guidance, navigation and control (GNC) of the guided projectile 14.

The PGMA 10 includes a nose or front end 42 and an opposite tail or rear end 44. When the PGMA 10 is connected to the munition body 12, a longitudinal axis X1 extends centrally from the rear end 18 of the munition body to the front end 42 of the PGMA 10. FIG. 1A depicts one embodiment of the PGMA 10 as generally cone-shaped and defines the nose 42 of the PGMA 10. The one or more canards 28a, 28b of the canard assembly 28 are controlled via the CAS 30. The PGMA 10 further includes a forward tip 46 and a second annular edge 48. In one embodiment, the second annular edge 48 is a trailing annular edge 48 positioned rearward from the tip 46. The second annular edge 48 is oriented centrally around the longitudinal axis X1. The second annular edge 48 on the PGMA 10 is positioned forwardly from the leading edge 20 on the munition body 12. The PGMA 10 further includes a central cylindrical extension 50 that extends rearward and is received within the cylindrical cavity 22 via a threaded connection.

The second annular edge 48 is shaped and sized complementary to the first annular edge 20. In one particular embodiment, a gap 52 is defined between the second annular edge 48 and the first annular edge 20. The gap 52 may be an annular gap surrounding the extension 50 that is void and free of any objects in the gap 52 so as to effectuate the free rotation of the PGMA 10 relative to the munition body 12.

PGMA 10 may include at least one lift canard 28a extending radially outward from an exterior surface 54 relative to the longitudinal axis X1. The at least one lift canard 28a is pivotably connected to a portion of the PGMA 10 via the CAS 30 such that the lift canard 28a pivots relative to the exterior surface 54 of the PGMA 10 about a pivot axis X2. In one particular embodiment, the pivot axis X2 of the lift canard 28a intersects the longitudinal axis X1. In one particular embodiment, a second lift canard 28a is located diametrically opposite the at least one lift canard 28a, which could also be referred to as a first lift canard 28a. The second lift canard 28a is structurally similar to the first lift canard 28a such that it pivots about the pivot axis X2. The PGMA 10 can control the pivoting movement of each lift canard 28a via the CAS 30. The first and second lift canards 28a cooperate to control the lift of the guided projectile 14 while it is in motion after being fired from a launch assembly 56 (FIG. 3).

Figure 2:
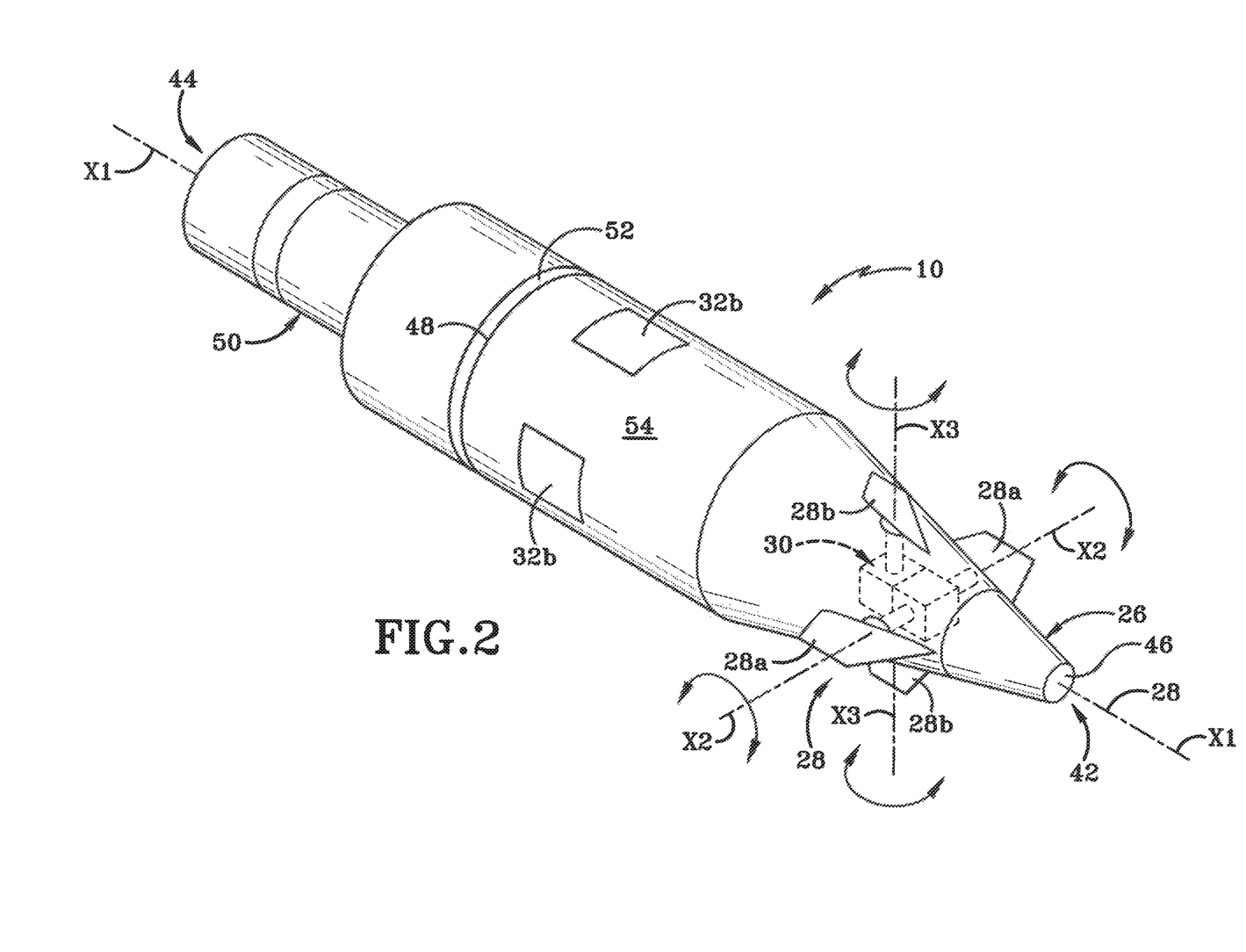
FIG. 2 is a schematic perspective view of the precision guidance munition assembly according to one embodiment.

FIG. 2 depicts and embodiment of the precision guidance munition assembly, wherein the PGMA 10 may further include at least one roll canard 28b extending radially outward from the exterior surface 54 relative to the longitudinal axis X1. In one example, the at least one roll canard 28b is pivotably connected to a portion of the PGMA 10 via the CAS 30 such that the roll canard 28b pivots relative to the exterior surface 54 of the PGMA 10 about a pivot axis X3. In one particular embodiment, the pivot axis X3 of the roll canard 28b intersects the longitudinal axis X1. In one particular embodiment, a second roll canard 28b is located diametrically opposite the at least one roll canard 28b, which could also be referred to as a first roll canard 28b. The second roll canard 28b is structurally similar to the first roll canard 28b such that it pivots about the pivot axis X3. The PGMA 10 can control the pivoting movement of each roll canard 28b via the CAS 30. The first and second roll canards 28b cooperate to control the roll of the guided projectile 14 while it is in motion after being fired from the launch assembly 56 (FIG. 3). While the launch assembly is shown as a ground vehicle in this example, the launch assembly may also be on vehicles that are air-borne assets or maritime assets. The air-borne assets, for example, includes planes, helicopters and drones.

The rotation sensor 32f is carried by the PGMA 10 and is configured to measure, sense, or otherwise determine the rotation frequency (i.e., the spin rate) of the munition body 12 relative to the PGMA 10. In one particular embodiment, the PGMA 10 may be considered to be "despun," where the term despun refers to little to no rotation about the longitudinal axis X1. "Little to no rotation" refers to a PGMA 10 that rotates less than ten rotations per second (i.e., 10 Hz or less). If the PGMA 10, which may also be referred to as the despun PGMA section 10, rotates, its rotation rate can be measured by a gyro, a compass or other sensor carried by the PGMA 10. The munition's body 12 rotation frequency is the difference between the rotation sensor measurement and the measured rate of the despun PGMA section 10.

The rotation sensor 32f may be located along any portion of the PGMA 10 where it can sense the rotation of the munition body 12. In one particular embodiment, the rotation sensor 32f is positioned on the PGMA 10. More particularly, the rotation sensor 32f is positioned near the gap 52 between the PGMA 10 and the munition body 12, and is oriented to sense rotational movement occurring rearward from the rotation sensor 32f. In one particular embodiment, the rotation sensor 32f is along the second annular edge 48. In another particular embodiment, the rotation sensor 32f may be coextensive with the second annular edge 48. When the rotation sensor 32f is at or near the second annular edge 48, the rotation sensor 32f may be configured to sense rotation of the munition body 12 at or near the first annular edge 20 thereof. Other locations of the rotation sensor 32f on the PGMA 10 are entirely possible. For example, the rotation sensor 32f may be located on the cylindrical extension 50 such that the rotation frequency is measured from within the cavity 22. In this situation, the rotation sensor 32f would be located rearward from the leading annular edge 20 of the munition body 12. Further, the rotation sensor 32f does not necessarily refer to one sensor. The rotation sensor 32f may be collectively defined by a plurality of sensing devices that are networked together to determine the rotation frequency of the munition body 12 relative to the PGMA 10.

The rotation sensor 32*f* can be any sensor that is able to determine the rotation frequency of the munition body 12. By way of non-limiting example, the rotation sensor 32*f* is an optical sensor, accelerometer sensing accelerations experienced during rotation of the munition body 12, or any other suitable sensor.

In one particular embodiment, the rotation sensor 32*f* is a hall effect sensor, which is also shown generally at 32*f*. The hall effect sensor 32*f* is installed along or near the second annular edge 48 of the PGMA 10. In this embodiment, at least one magnet 55 is installed or otherwise fixedly connected to the munition body 12 along or near the first annular edge 20. The hall effect sensor 32*f* senses the magnet 55 as the magnet 55 rotates and passes the hall effect sensor 32*f*. In one particular embodiment, the hall effect sensor 32*f* is a transducer that varies its output voltage in response to a magnetic field. The hall effect sensor 32*f* may include a thin strip of metal that has a current applied along it. In the presence of the magnetic field, the electrons in the metal strip are deflected towards one edge producing a voltage grading across the short side of the strip, which is perpendicular to the feed current. In one particular embodiment, the hall effect sensor 32*f* operates as an analog transducer to directly return a voltage. The magnet 55 on the munition body 12 that is used in conjunction with the hall effect sensor 32*f* will have a known magnetic field which will be determined to optimize the distance that the hall plate should be spaced from the magnet 55.

By way of non-limiting example, some of the following materials are suitable for fabricating portions of the hall effect sensor 32*f*: gallium arsenide (GaAs), indium arsenide (InAs), indium phosphide (InP), indium antimonide (InSb), and graphene. Hall effect sensors may sometimes be considered linear transducers. As a result, in one example the hall effect sensors require a linear circuit for processing the sensors' output signal. In some scenarios, a linear circuit provides a constant driving current to the sensors and amplifies the output signal. The hall effect sensor interface may include input diagnostics, fault protection for transient conditions, and short or open circuit detection.

An alternative sensor is an optical sensor on the PGMA 10 and a small mirror or paint spot on the edge 20 of the munition body 12. As the munition body 12 rotates the optical sensor will detect the spot. Furthermore, the entire edge 20 can be optically encoded with an optical pattern allowing the optical sensor to sense relative position vs time. This then allows a precise relative rotation rate to be determined.

FIG. 3 depicts the operation of the PGMA 10 when it is connected to the munition body 12 forming the guided projectile 14. As shown in FIG. 3, the guided projectile 14 is fired from a launch assembly 56 towards the target 24 located at a predetermined or nominal distance 58 from the launch assembly 56. Guided projectiles are typically limited in how much they can maneuver. Thus, the maneuver authority of the guided projectile 14 is an important component in launching the guided projectile 14. The present disclosure provides a system and device to obtain the spin rate or rotation frequency of the munition body 12 relative to the PGMA 10 shortly after being launched from the launch assembly 56 in order to determine velocity of the guided projectile 14. Once the velocity of the guided projectile 14 is known, a correction can be made, by deflecting the canards 28*a*, 28*b*, to precisely guide the guided projectile 14 towards its intended target 24.

When the guided projectile 14 is launched from the launch assembly 56 or gun tube, the rate at which the guided projectile 14 spins is directly related to its launch speed or launch velocity. The velocity of the guided projectile 14 is a function of the spin rate or rotation frequency times a constant. The constant depends on the gun twist or rifling, powder, and explosive force used to discharge the guided projectile 14. Issues continue to exist with launching guided projectiles inasmuch as when they are launched from the launch assembly, the velocity can vary based on temperature, wind, and other external conditions. The variable velocity introduces an error which results in a change in the range from the intended target 24. The present disclosure addresses these issues by measuring the spin rate or rotation frequency of the munition body 12 shortly after being launched from the launch assembly 56 to correct the trajectory of the guided projectile 14 to reduce the range error. One exemplary feature is that it measures the velocity early in the flight so that a correction can also be applied early in the flight. Other sensors, such as GPS, are often unable to provide an early measurement.

The PGMA performs a corrective maneuver by adjusting one or more canards 28*a*, 28*b*, to either increase the range or decrease the range as needed to guide the guided projectile 14 towards the target 24. In accordance with one aspect of the present disclosure, the range correction maneuver begins early in flight of the guided projectile 14. Typically, the range correction occurs prior to the guiding sensor 32*a*, such as a GPS system, activating and linking with a satellite 59. This is beneficial because the earlier that the corrective maneuver can initiate, the more control authority is possible and this allows larger range errors to be corrected. For example, if the system and device determine that the velocity, based on the spin rate of the munition body 12, is going too fast and will overshoot its intended target 24, the system will perform a corrective maneuver to shorten the range of the guided projectile 14. Likewise, if the device determines, based on the spin rate of the body of the guided projectile 14, that the launch velocity was too slow, the system will perform a corrective maneuver to lengthen the range of the guided projectile 14 to direct the same towards the intended target 24.

In operation, as the munition body 12 spins, the magnet 55 passes the hall effect sensor 32*f* located on the PGMA 10. A pulse is generated each time the magnet 55 passes the hall effect sensor 32*f*. The munition body 12 spin rate is determined by how many pulses are obtained per second or some other time. In one particular embodiment, one pulse corresponds to one rotation of the munition body 12. However, additional magnets could be utilized. For example, two diametrically opposite magnets could be placed on the rotating munition body 12 such that each pulse observed by the sensor 32*f* represents half a rotation. Additionally, other magnets may be incorporated into the munition body 12 and the hall effect sensor 32*f* could be optimized to recognize that a pulse is representative of a function of the number of magnets relative to spin. For example, if there are three magnets equally spaced 120° apart about the longitudinal axis X1, then one pulse would represent one-third rotation of the munition body 12 relative to the PGMA 10.

Once the spin rate is determined by the hall effect sensor 32*f*, the spin rate is provided to the microprocessor 40 carried by the PGMA 10. The microprocessor 40 calculates the launch velocity of the guided projectile 14 based on the spin rate of the munition body 12. Once the processor 40 determines the launch velocity of the guided projectile 14, the processor 40 provides the launch velocity to an estimation logic to determine whether a range error of the guided projectile 14 will cause the guided projectile 14 to miss the intended target 24. The estimation logic compares launch velocity of the guided projectile 14, based on the rotation frequency, with a predicted launch velocity based on rifling of the launch assembly 56 and a known explosive charge in the launch assembly 56. The results of the estimation logic are provided to a corrective maneuver logic which is also carried by the PGMA 10. The corrective maneuver logic is executed in conjunction with a set of instructions stored on the at least one non-transitory computer-readable storage medium 38 in the PGMA 10. Collectively, the corrective maneuver logic utilizes the velocity to determine where the guided projectile 14 will land relative to its intended target 24. The corrective maneuver logic implements directions to various components of the PGMA 10, such as to move or pivot the lift canards 28a in a manner to guide the guided projectile 14 more closely towards its intended target 24. Where the maneuver logic is based on the launch velocity of the guided projectile 14 as determined by spin rate shortly after being fired from the launch assembly 56.

In another particular embodiment, the at least one non-transitory computer-readable storage medium 38 carried by the PGMA 10 has instructions encoded thereon that, when executed by the processor 40 carried by the PGMA 10 operates to move the lift canard 28a on the canard assembly 28 to maneuver the guided projectile 14 during flight. The instructions include: determine the rotation frequency of the munition body 12 with the rotation sensor 32f; determine a velocity of the guided projectile 14 based, at least in part, on the rotation frequency; determine a range of the guided projectile 14 based, at least in part, on the velocity; determine whether the range is sufficient for the guided projectile 14 to impact the target 24 based on a known distance (or estimated impact point as predicted using the velocity) between the target 24 and the launch assembly 56; and if the range is insufficient, then adjust a canard 28a, 28b, on the canard assembly 28 to maneuver the guided projectile 14 towards the target 24 and reduce range error.

Further, this embodiment or another embodiment provides instructions that include: initiate the GPS 32a carried by the PGMA 10 after the guided projectile 14 is fired; determine the rotation frequency of the munition body during a first period of time; cease sensing the rotation frequency of the munition body 14 with the rotation frequency once the GPS 32a is activated; and guide the guided projectile 14 based on the GPS 32a after the first period of time. In this embodiment the GPS 32a is the another sensing device, and is activated after a first period of time, measured from when the guided projectile 14 exits the launch assembly 56 to when the GPS 32a is actively operational. The rotation frequency is measured until the GPS is actively operational, which is after the first period of time.

FIG. 3 depicts an example of when the GPS 32a is activated after the first period of time, wherein the first period of time is measured from when the guided projectile 14 exits the launch assembly 56 to when the GPS 32a is actively operational. More particularly, shortly after being fired from the launch assembly 56, the guided projectile 14 is at a first position A. While at the first position A, the GPS 32a is not fully operational and the GPS 32a is unable to determine the location, velocity, and other parameters of the guided projectile 14. The GPS 32a is operationally active at a second position B (i.e., when the GPS 32a is initiated). When the GPS 32a is operationally active, the GPS 32a velocity calculation supersedes the velocity calculation determined by the spin rate observed by the rotation sensor 32f. Thus, the guided projectile 14 includes an early velocity calculation, which refers to the first period of time that is after being fired from the launch assembly 56 to when the GPS 32a is actively operational. In one particular embodiment, the first period of time is in a range from about five seconds to about twenty seconds. More particularly, the range may be from about eight seconds to about fifteen seconds. Even more particularly, the range may be about ten seconds. In the first segment of flight, the spin rate velocity estimate allows estimation of error and corrective steering maneuver to occur in response to the velocity estimate.

The processor 40 performs the following calculation(s) based, at least in part, on the calculation of the launch velocity or initial velocity of the guided projectile 14. The twist (T) (i.e., rifling) is a number representing the number of turns per meter of the barrel of the launch assembly 56. Initial velocity or launch velocity (V) is a function of F/T, where F is the frequency (in Hz) determined by the rotation sensor 32f (such as the hall effect sensor 32f described above). The initial velocity (V) is used to predict the expected range and thus determine if a range correction is needed. The system may utilize a projectile dynamics model such as three degree-of-freedom (DOF) model that is initialized with the initial velocity V to predict the range. Once the guided projectile 14 has a range estimate, it may then make a range correction. Then, once GPS 32a is activated and locked-on, the guided projectile 14 can switch and utilize the GPS 32a to continue to make corrections.

Figure 4:
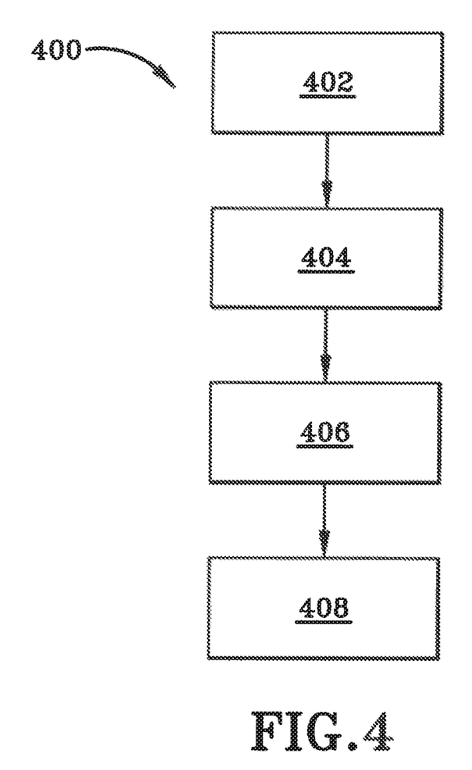
FIG. 4 is a flow chart of one method or process of the present disclosure.

FIG. 4 depicts one embodiment method or process of performing the early range correction of a guided projectile 14 including a PGMA 10 generally at 400. The method 400 includes determining the rotation frequency of the munition body 12 with the rotation sensor 32f, which is shown generally at 402. The method 400 may include determining the velocity of the guided projectile 14 based, at least in part, on the rotation frequency, which is shown generally at 404. The method 400 may include determining a range of the guided projectile 14 based, at least in part, on the velocity, which is shown generally at 406. The method 400 may further include determining whether the range is sufficient for the guided projectile 14 to impact a target 24 based on a known distance between the target 24 and the launch assembly 56, and if the range is insufficient (range error), then adjusting a canard 28a, 28b on the canard assembly 28 to maneuver the guided projectile 14 towards the target 24 and reduce the range error, which is shown generally at 408.

Generally, aspects of the present disclosure determine relative spin rate, determine PGMA 10 despun rate, compute munition body 12 spin rate, compute guided projectile 14 speed, estimate range error using speed, and determine canard commands to correct maneuver of the guided projectile 14.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium 38.

Also, a computer or smartphone utilized to execute the software code or instructions via its processors may have one or more input and output devices. These devices can be used, among other things, to present a user interface. Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium 38 (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Guided projectile" or guided projectile 14 refers to any launched projectile such as rockets, mortars, missiles, cannon shells, shells, bullets and the like that are configured to have in-flight guidance.

"Launch Assembly" or launch assembly 56, as used herein, refers to rifle or rifled barrels, machine gun barrels, shotgun barrels, howitzer barrels, cannon barrels, naval gun barrels, mortar tubes, rocket launcher tubes, grenade launcher tubes, pistol barrels, revolver barrels, chokes for any of the aforementioned barrels, and tubes for similar weapons systems, or any other launching device that imparts a spin to a munition round or other round launched therefrom.

In some embodiments, the munition body 12 is a rocket that employs a precision guidance munition assembly 10 that is coupled to the rocket and thus becomes a guided projectile 14.

"Precision guided munition assembly," as used herein, should be understood to be a precision guidance kit, precision guidance system, a precision guidance kit system, or other name used for a guided projectile.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A precision guidance munition assembly for a guided projectile, comprising:
   a front end and a rear end of the precision guidance munition assembly defining a longitudinal axis therebetween;
   a canard assembly, rotatable about the longitudinal axis, with at least one canard, wherein the at least one canard is moveable;
   a munition body coupled to the rear end of the precision guidance munition assembly;
   a rotation sensor carried by the precision guidance munition assembly; and
   at least one non-transitory computer-readable storage medium carried by the precision guidance munition assembly having a set of instructions encoded thereon that when executed by at least one processor operates to aid in guidance, navigation, and control of the guided projectile, wherein the set of instructions perform the following:
      measure a spin rate of the guided projectile using the rotation sensor after firing the guided projectile from a launch assembly;
      determine a velocity of the guided projectile based, at least in part, on the spin rate;
      estimate a miss distance that the guided projectile will miss a target based at least in part on the velocity; and
      generate a command to reduce the miss distance.

2. The precision guidance munition assembly of claim 1, wherein the rotation sensor measures an initial spin rate of the guided projectile.

3. The precision guidance munition assembly of claim 1, wherein the rotation sensor is a hall effect sensor.

4. The precision guidance munition assembly of claim 3, further comprising a magnet carried by the munition assembly positioned to move past the hall effect sensor when the munition body rotates about the longitudinal axis.

5. The precision guidance munition assembly of claim 1, further comprising:
   at least one sensor configured to determine the velocity of the guided projectile.

6. The precision guidance munition assembly of claim 5, wherein the at least one sensor is a global positioning system (GPS).

7. The precision guidance munition assembly of claim 1, wherein the set of instructions further comprise:
   initiate the GPS after a first period of time, wherein the first period of time is measured from when the guided projectile exits the launch assembly to when the GPS is actively operational;
   generate the command for the guided projectile based on the GPS after the first period of time.

8. The precision guidance munition assembly of claim 7, wherein the set of instructions further comprise:
   cease sensing the spin rate of the munition body with the rotation sensor once the GPS is activated.

9. The precision guidance munition assembly of claim 1, wherein the command, is a coning command executed through movement of the at least one canard.

10. The precision guidance munition assembly of claim 1, further comprising:
    a reward edge on the precision guidance munition assembly;
    a forward edge on the munition body, wherein the rotation sensor is adjacent one of the reward edge and the forward edge; and
    a gap defined between the reward edge, and the forward edge.

11. The precision guidance munition assembly of claim 10, further comprising:
    at least one rotation signal generator carried by and positioned adjacent the forward edge of the munition body.

12. The precision guidance munition assembly of claim 11, wherein the rotation signal generator is a magnet.

13. The precision guidance munition assembly of claim 1 wherein the set of instructions further comprise:
    determine a nominal launch velocity of the guided projectile based, at least in part, on an explosive charge used to fire the guided projectile from the launch assembly.

14. A method, comprising:
    firing a guided projectile including a precision guidance munition assembly from a launch assembly towards a target;
    sensing a spin rate of a munition body of the guided projectile with a rotation sensor;
    determining a velocity of the guided projectile based, at least in part, on the spin rate;
    determining a range of the guided projectile based, at least in part, on the velocity;
    determining whether the range is sufficient for the guided projectile to impact the target based on a known distance between the target and the launch assembly; and
    adjusting at least one canard on a canard assembly to maneuver the guided projectile and reduce a range error.

15. The method of claim 14, further comprising:
    despinning the precision guidance munition assembly in relation to the munition body.

16. The method of claim 14, further comprising:
    initiating a global positing system (GPS) carried by the precision guidance munition assembly after a first period of time.

17. The method of claim 16, further comprising:
    ceasing the sensing of the spin rate of the munition body with the rotation sensor once the GPS is initiated.

18. The method of claim 16, further comprising:
    using the GPS to determine the velocity of the guided projectile; and
    maneuvering the at least one canard on the canard assembly in response to the velocity.

19. The method of claim 14, wherein the rotation sensor is a hall effect sensor.

20. A computer program product including one or more non-transitory machine-readable mediums having instructions encoded thereon that, when executed by one or more processors, result in a plurality of operations for guiding a projectile, the operations comprising:
    sensing a spin rate of a munition body of the projectile with a rotation sensor;
    determining a velocity of the projectile based, at least in part, on the spin rate;
    determining a range of the projectile based, at least in part, on the velocity;
    determining whether a range error for the projectile to impact the target based on a known distance between the target and the launch assembly; and adjusting at least one canard on a canard assembly to maneuver the projectile and reduce the range error.

* * * * *